United States Patent [19]

Royal, Jr. et al.

[11] Patent Number: 5,980,090
[45] Date of Patent: Nov. 9, 1999

[54] INTERNET ASSET MANAGEMENT SYSTEM FOR A FUEL DISPENSING ENVIRONMENT

[75] Inventors: William C. Royal, Jr., Greensboro; Randall O. Watkins, Stokesdale, both of N.C.

[73] Assignee: Gilbarco., Inc., Greensboro, N.C.

[21] Appl. No.: 09/021,237

[22] Filed: Feb. 10, 1998

[51] Int. Cl.⁶ .................................................. G06F 17/00
[52] U.S. Cl. ............................. 364/479.11; 364/479.04; 364/479.06; 364/479.08; 364/479.14
[58] Field of Search ........................... 364/479.11, 479.14, 364/479.01, 479.06, 479.04, 479.08; 705/16, 26, 27, 413; 707/513

[56] References Cited

U.S. PATENT DOCUMENTS

| | | | |
|---|---|---|---|
| 3,949,207 | 4/1976 | Savary et al. | 364/479.06 |
| 4,247,899 | 1/1981 | Schiller et al. | 364/479.11 |
| 5,319,545 | 6/1994 | McGarvey et al. | 364/403 |
| 5,400,253 | 3/1995 | O'Connor | 364/442 |
| 5,404,291 | 4/1995 | Kerr et al. | 364/407 |
| 5,500,890 | 3/1996 | Rogge et al. | 379/91 |
| 5,535,130 | 7/1996 | Long | 364/479.01 |
| 5,557,268 | 9/1996 | Hughes et al. | 340/933 |
| 5,572,643 | 11/1996 | Judson | 395/793 |
| 5,581,461 | 12/1996 | Coll et al. | 395/205 |
| 5,581,749 | 12/1996 | Hossain et al. | 395/600 |
| 5,583,940 | 12/1996 | Vidrascu et al. | 380/49 |
| 5,588,060 | 12/1996 | Aziz | 380/30 |
| 5,590,197 | 12/1996 | Chen et al. | 380/24 |
| 5,608,621 | 3/1997 | Caveney et al. | 395/216 |
| 5,611,051 | 3/1997 | Pirelli | 395/210 |
| 5,734,851 | 3/1998 | Leatherman et al. | 395/329 |
| 5,761,071 | 6/1998 | Bernstein et al. | 364/479.08 |
| 5,798,931 | 8/1998 | Kaehler | 364/479.01 |
| 5,809,298 | 9/1998 | Nakada | 395/615 |
| 5,831,861 | 11/1998 | Warn et al. | 364/479.01 |

FOREIGN PATENT DOCUMENTS

| 0 723 241 A1 | of 1996 | European Pat. Off. . |
|---|---|---|
| WO 95/05609 | of 1995 | WIPO . |
| WO 98/03980 | of 1998 | WIPO . |

OTHER PUBLICATIONS

International Forecourt Standards Forum; Standard Forecourt Protocol, Part III.X.
http://www.spyglass.com/products/microserver/ Nov. 1997.
http://www.spyglass.com/products/dmosaic/ Nov. 1997.

*Primary Examiner*—William E. Terrell
*Assistant Examiner*—Khoi H. Tran
*Attorney, Agent, or Firm*—Coats & Bennett, P.L.L.C.

[57] ABSTRACT

The present invention provides communication servers at each device in a fueling environment and connecting the servers to a common network. The network may be a local network or a largely remote network, such as the Internet. Preferably, in either embodiment, primary communications between these devices and any devices accessible via the Internet use the hypertext transfer protocol (HTTP) and hypertext markup language (HTML). In particular, each device server is adapted to facilitate real-time access between the device server and the remote device upon access of a particular page, script or function. In particular, the present invention relates to embedding executable content onto an HTML page so that when the page is loaded into an HTML browser after being accessed, the executable content starts running automatically.

19 Claims, 8 Drawing Sheets

INTERNET ASSET MANAGEMENT SYSTEM FOR A FUEL DISPENSING ENVIRONMENT

BACKGROUND OF THE INVENTION

The present invention relates to asset management systems and, in particular, systems for providing a management architecture accessible from remote Internet-compliant browsers to provide real-time functions relating to the access, configuration and administration of various features associated with fuel dispensers and other forecourt devices including, but not limited to, card authorization terminals, video/merchandising displays, advertising, and price posting signs, in addition to point-of-sale (POS) devices at any particular store location and related inventory management systems.

Historically, there has never been an organized system for remotely managing various aspects of a fueling site or convenience store in both an efficient and comprehensive manner. In particular, viewing real-time status and configuration information of convenience store and fueling station devices has always been an operation done locally at a particular site. These functions, such as pricing and advertising, have been handled separately on a customer's proprietary network, but complete store management functionality has never been available. Normally, most management procedures are manual and very costly. Software updates require certified technicians to visit the site, load the software and test its functionality.

Equipment failures often go unnoticed until the operator's business is affected due to unhappy customers. The operator will then call the distributor and report the error, often with very sketchy and unhelpful details. The certified technician then has to visit the site to troubleshoot the unit before being able to assess the problem and acquire the appropriate parts which may require a second costly visit. In short, requiring the touch of a qualified technician is both expensive and time consuming. Furthermore, if a problem arises that causes the devices to be shut down, waiting for a technician to arrive to diagnose the nature of the problem and then make a return trip to repair the equipment results in additional lost sales and general customer dissatisfaction which, in the highly competitive fuel dispensing market, may lead to the permanent loss of a customer. Although various attempts have been made to provide technicians with information to diagnose the problem, information gathering has always been an expensive, manual process requiring qualified personnel to phone or visit the site to survey items such as equipment age, configurations and hardware and software versions.

Currently, Gilbarco and other dispenser manufacturers offer POS systems allowing remote, off-line viewing of inventory and sales data of a convenience store through a proprietary, third-party interface. This interface is costly and inconvenient because it requires dedicated applications and tools to access the interface. Furthermore, each system is different and requires technicians from the manufacturer to make any changes to the system in order to upgrade, reconfigure or test the system. Thus, there is a need for a uniform management system capable of accessing the various devices in a fueling environment to provide remote configurations, upgrades and real-time monitoring. There is a need for a capability that allows service contractors, equipment manufacturers and store management to access the various features and aspects of the system to view sales and inventory data, change prices, transmit software upgrades, access configuration information, and monitor operation and status of various devices from remote locations.

Earlier attempts at using the Internet to provide real-time functions were unsuccessful because monitoring live status of devices, particularly those on the forecourt, does not fit well into the orthodox world wide web architectures.

SUMMARY OF THE INVENTION

The present invention fulfills these needs by providing communication servers at each device in a fueling environment and connecting the servers to a common network. The network may be a local network or a largely remote network, such as the Internet. Preferably, in either embodiment, primary communications between these devices and any devices accessible via the Internet use the hypertext transfer protocol (HTTP) and hypertext markup language (HTML). In particular, each device server is adapted to facilitate real-time access between the device server and the remote device upon access of a particular page, script or function. In particular, the present invention relates to embedding executable content into an HTML page so that when the page is loaded onto an HTML browser after being accessed, the executable content starts running automatically without additional compiling, translation or manipulation of the HTML code. Preferably, the executable content will act to connect the browser back over the network to the same device from which the page was accessed.

In certain embodiments, the connection may be to a new network port or address, other than that of the page, that supplies real-time status data or opens a connection capable of downloading software data for reconfiguration or updates. Furthermore, the connection back over the network may use a different protocol in order to increase data transfer or control efficiency. Example formats for this executable content are Java™ "applets," which are small applications that conform to a restricted set of programming standards for running on HTML compliant browsers, or ActiveX™ components, a Microsoft® standard for achieving the same functionality as a Java™ applet, with less restrictions than Java™. The tradeoff for functionality with ActiveX™ components results in less security and a greater browser dependency.

Alternatively, the system may use techniques that allow a server to keep a connection open to a browser after the HTML page has been downloaded and to periodically send updated HTML pages. The updated pages will result in continued refreshment of data. Notably, in either of these two embodiments, applicants use an embedded function, which includes any function incorporated in or associated with an HTML page, script, function or like structure. The embedded function acts to facilitate either a new or continued connection between the remote browser and the access server. The function may operate at the server to continue a communication link or operate at the browser to reestablish or provide a new communication link. Configuring a server at the various fueling environment devices with a remotely accessible page having embedded content allows remote, automatic access to the server and connected control systems to enable real-time functions and communications between the browser control systems through the accessed server.

Accordingly, one aspect of the present invention is a fuel dispenser facilitating remote management functions comprising a housing and a dispenser server at the housing including a control system, a network connection and a dispenser server task running on the control system. A hypertext markup language-compliant page on the server is accessible through the network connection. An embedded function is associated with the page and is operable to facilitate real-time functions between a remote browser and the server system over a network. The dispenser also includes a fuel delivery system associated with the housing having a fuel supply line, a metering device, a delivery hose and a nozzle to permit the dispensing of fuel. The embedded function may be operable to run at the server when the remote browser accesses the page to maintain a connection between the server and the remote browser through the network connection. Alternatively, the embedded function is configured to be sent to the browser with the page when the remote browser accesses the page and is operable to run at the browser to provide a connection between the server and the remote browser through the network connection. The real-time function may include providing software upgrades, data upgrades, reconfigurations, audio delivery, video delivery and delivering control functions for various dispenser components. In the embodiment where the embedded function is sent to the browser to run, the function may operate to have the browser connect back to the server using a different protocol, at a different port or address.

The dispenser may be connected to a local network including a central control server apart from the fuel dispenser and having a central control system, a central network connection, and a central dispenser server task and browser running on the central control system. A router may be provided for facilitating network connections.

The invention may also be incorporated with various other fueling and retail environment devices to provide similar real-time functions including updating pricing gathering, inventory status, and changing prices and displays on signs, in addition to numerous other management functions for the various devices from a remote location without local intervention.

These and other aspects of the present invention will become apparent to those skilled in the art after reading the following description of the preferred embodiments when considered with the drawings.

DETAILED DESCRIPTION OF THE PREFERRED EMBODIMENT

Figure 1:
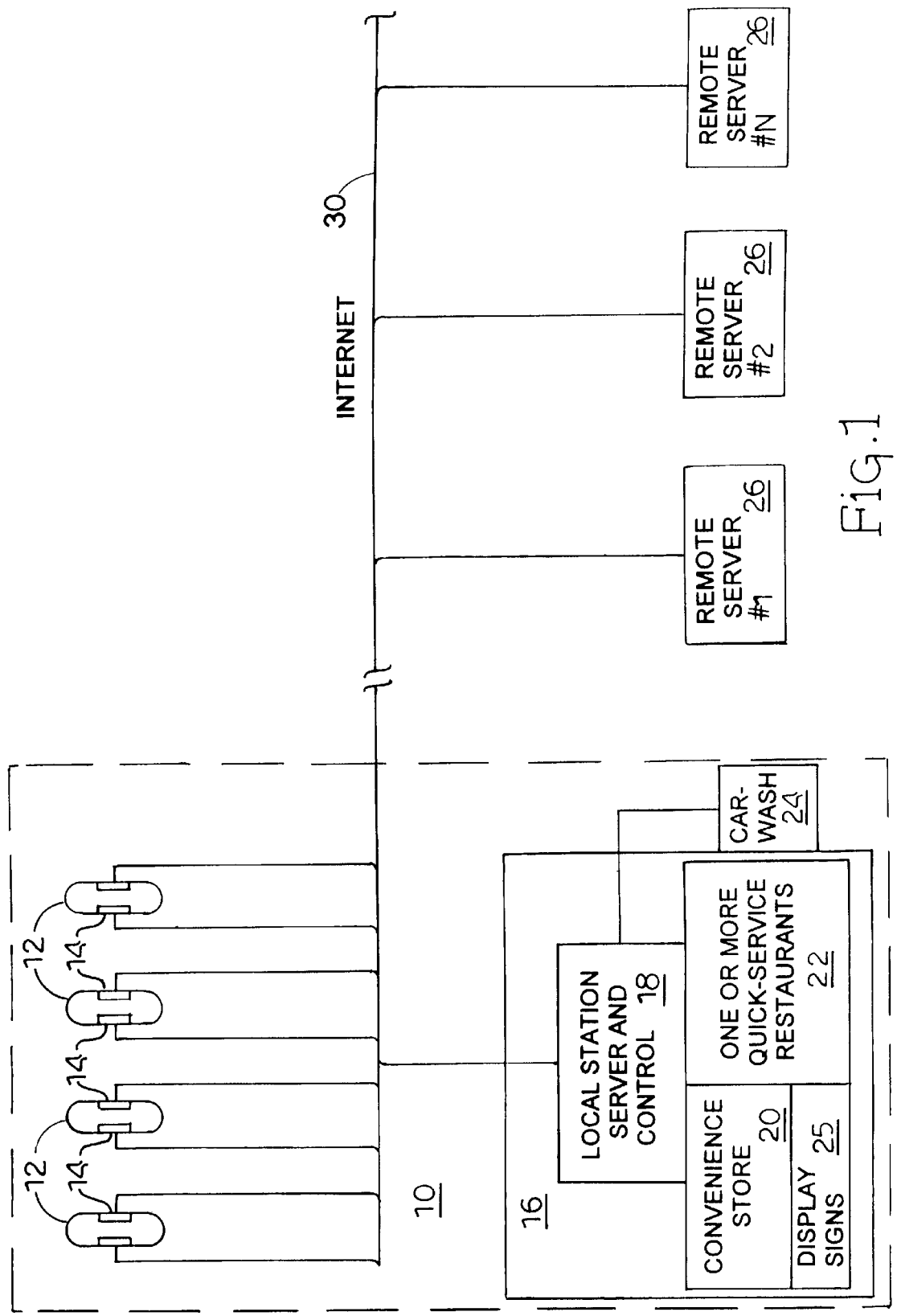
FIG. 1 is a block diagram of a fuel station store having dispensers and a local station server connected to the Internet according to the present invention.
Figure 2:
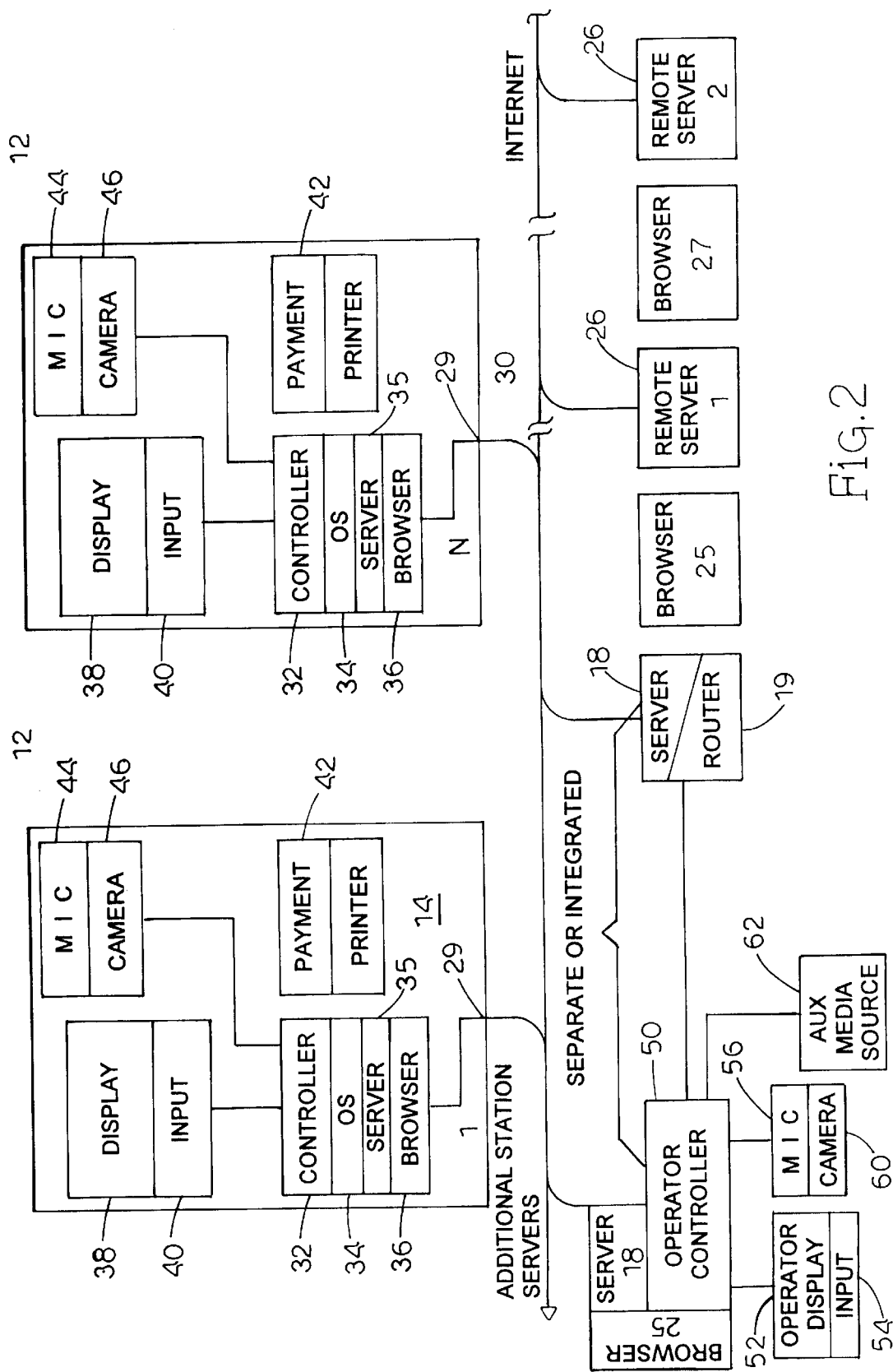
FIG. 2 is a block diagram of the fuel dispensing system architecture of the system of FIG. 1.
Figure 3:
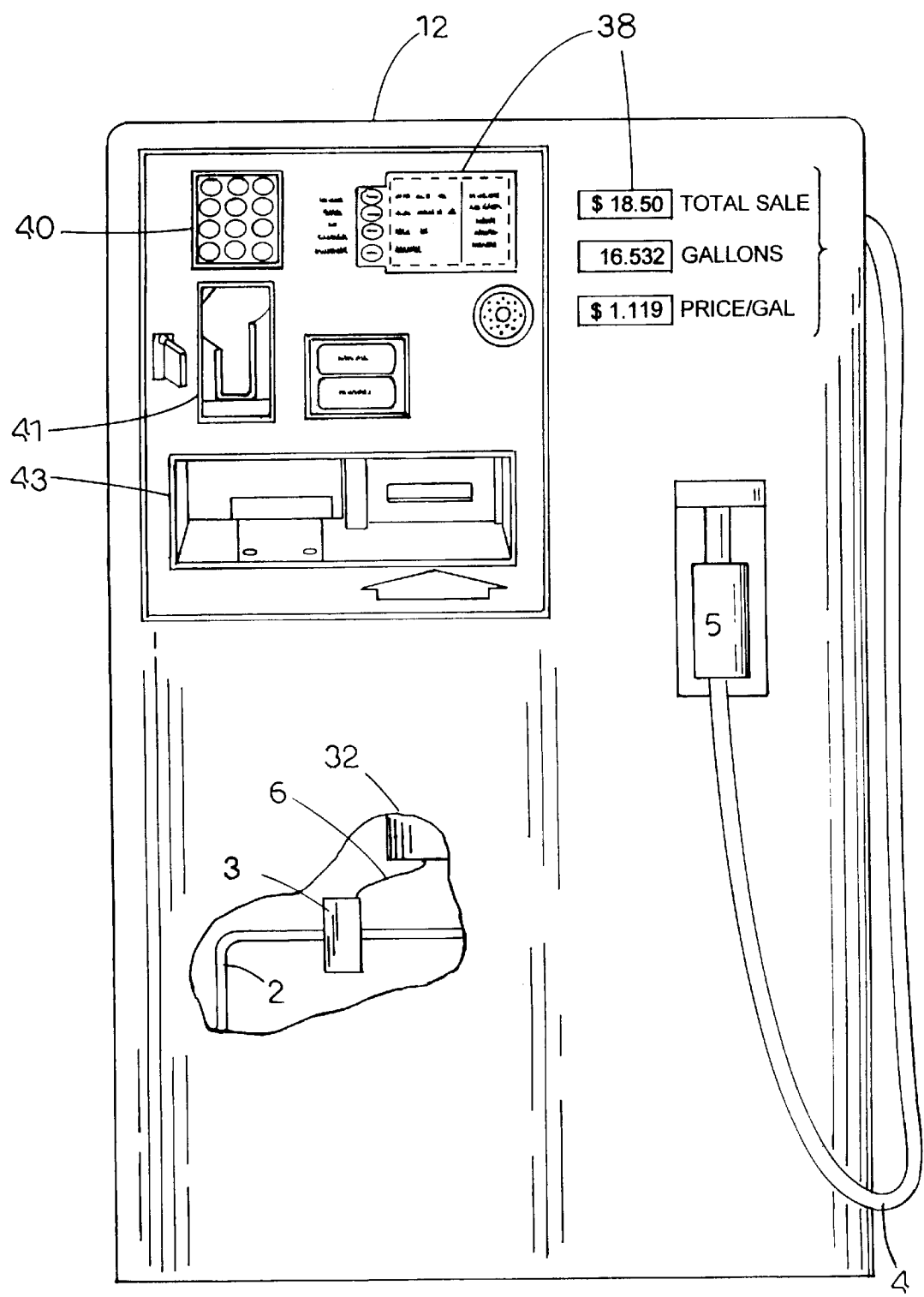
FIG. 3 is an elevational view, partially broken away, of a fuel dispenser constructed according to the present invention.

Referring now to the drawings in general, and FIGS. 1 and 2 in particular, it will be understood that the illustrations are provided to describe preferred embodiments of the invention and are not intended to limit the invention thereto. A fuel station environment 10 is shown having a plurality of fuel dispensers 12. Each dispenser 12 typically has at least two fueling positions 14 capable of delivering fuel and providing a graphical point-of-sale (POS) interface. As seen in FIG. 3, each fuel dispenser 12 has a housing provided with a conventional fuel supply line 2, a metering device 3, outlet hose 4 and nozzle 5. The metering device 3 communicates data relating to the volume of fuel dispensed along line 6 to a controller or control system 32. The interface will typically include one or more displays 38, an input device or keypad 40, a card reader 41, and cash acceptor 43. The dispensers 12 include the normal fuel delivery hardware discussed above to deliver fuel to a customer in a controlled manner. In addition to the hardware described, extra pumps, flow control valves, nozzles, hoses and control electronics may be present.

Referring again to FIGS. 1 and 2, a main service station store 16 is operably connected to each dispenser 12 and fueling position 14 in addition to a local station server and control system 18. The server and control system 18 is operationally associated with POS systems and/or transaction systems for a convenience store 20, one or more quick service restaurants 22, and associated car wash 24, or other service systems.

In the preferred embodiment, network access is provided between the various fueling positions 14, dispensers 12, the local station server 18, and any number of remote servers 26, which are located outside of the fuel station environment 10, via the Internet or similar network 30. Furthermore, direct connections between the Internet and the local server 18 may be provided with the dispenser 12.

The basic system architecture is a local network connecting the dispensers 12 and the local station server 18 wherein the local network may interact with the Internet or similar network 30. Each fueling position 14 is treated as a client capable of accessing services provided by the local server 18 and as a server capable of providing access to that particular position 14 and dispenser 12. Interactivity between these entities is accomplished in a manner similar to the way interactivity is accomplished on the Internet, and, preferably, identical to the manner in which interactivity is accomplished on the Internet. The system preferably uses HTML and HTML-compliant components, media players and services. Browsers at the respective devices may request local services from the various servers. Preferably, the browsers located along the Internet 30 may access the servers throughout the fueling environment.

When a browser attempts to access a remote server within the local network or from a remote location on the Internet, the system architecture generally uses the hypertext markup language (HTML). The Internet is a known computer network based on the client server model. Basically the Internet comprises a large network of servers accessible by the clients. Each of the clients operates a browser, which is a known software tool used to access servers through Internet access providers. A server operates a "web site," which supports files in the form of documents and pages. A network path to a server is identified by a uniform resource locator (URL) having a known syntax for defining a network connection and location through a defined and existing port or address.

The world wide web is a collection of servers of the Internet that use the hypertext transfer protocol (HTTP). HTTP is a known application protocol that provides users with access to files, which can be in different formats, such as text, graphics, images, sound and video, using a standard page description language, HTML. HTML provides basic document formatting and allows the developer to specify links to other servers and files therein. Use of an HTML-compliant client browser involves specification of a link having a URL. Upon such specification, the client makes a request to the server identified in the link and receives a web page, basically in document format, according to HTNM, in return. HTML provides exceptional freedom in creating graphics/text/graphic images and associated audio between servers and client browsers. HTTP and HTML allow complex services to be accessed by clients having a minimum amount of hardware sophistication. The primary computational horsepower is reserved for the servers providing the requested services.

Referring particularly to FIG. 2, a fueling position 14 for each dispenser 12 (1 to N) is shown in greater detail. Each fueling position is associated with a control system having one or more controllers 32, operating system 34, server 35, browser 36, display 38 and input device 40, such as a keypad, touch pad or touch screen. The display 38 and input device 40, in conjunction with the controller 32, provide a graphical user interface 39 for each fueling position 14. The operating system 34 is adapted to run any number of software applications required to operate the dispenser, the graphical user interface 39, server 35 and browser 36. Each fueling position 14 also includes a payment accepting device 42, such as the magnetic strip card reader 41, smartcard reader, or currency acceptor 43. Other payment systems may be substituted.

Each graphical user interface 39 may include a control system or operate in conjunction with a single control system adapted to operate both interfaces on a single dispenser 12. In one configuration of the invention, each fueling position 14 acts as a thin client capable of interacting with a network of servers. The controller 32 and associated user interfaces are preferably designed to minimize the hardware commitment necessary in each dispenser, while having sufficient capability to establish interactivity with the user and provide fuel dispenser control and communication therewith. Most computer intensive functions are provided as services from the various local and remote servers 18, 26. Merchandising and business rule interpretations are handled in the system's nomenclature as services. Although certain functions and services may be run at the dispenser, most functions dealing with customer transactions, information dissemination and advertising or merchandising are preferably performed as services provided by the various local and remote servers. The browser software 36 for each client preferably has the ability to request services either locally or remotely, via the Internet or similar network. Certain services may be automatically requested by the browser and each client, while others await responses by a customer. With respect to FIG. 2, it should be noted that the server 18 may be configured to directly access the various server devices, including those in the forecourt, and/or to act as an intermediary between these devices and the Internet.

Figure 4:
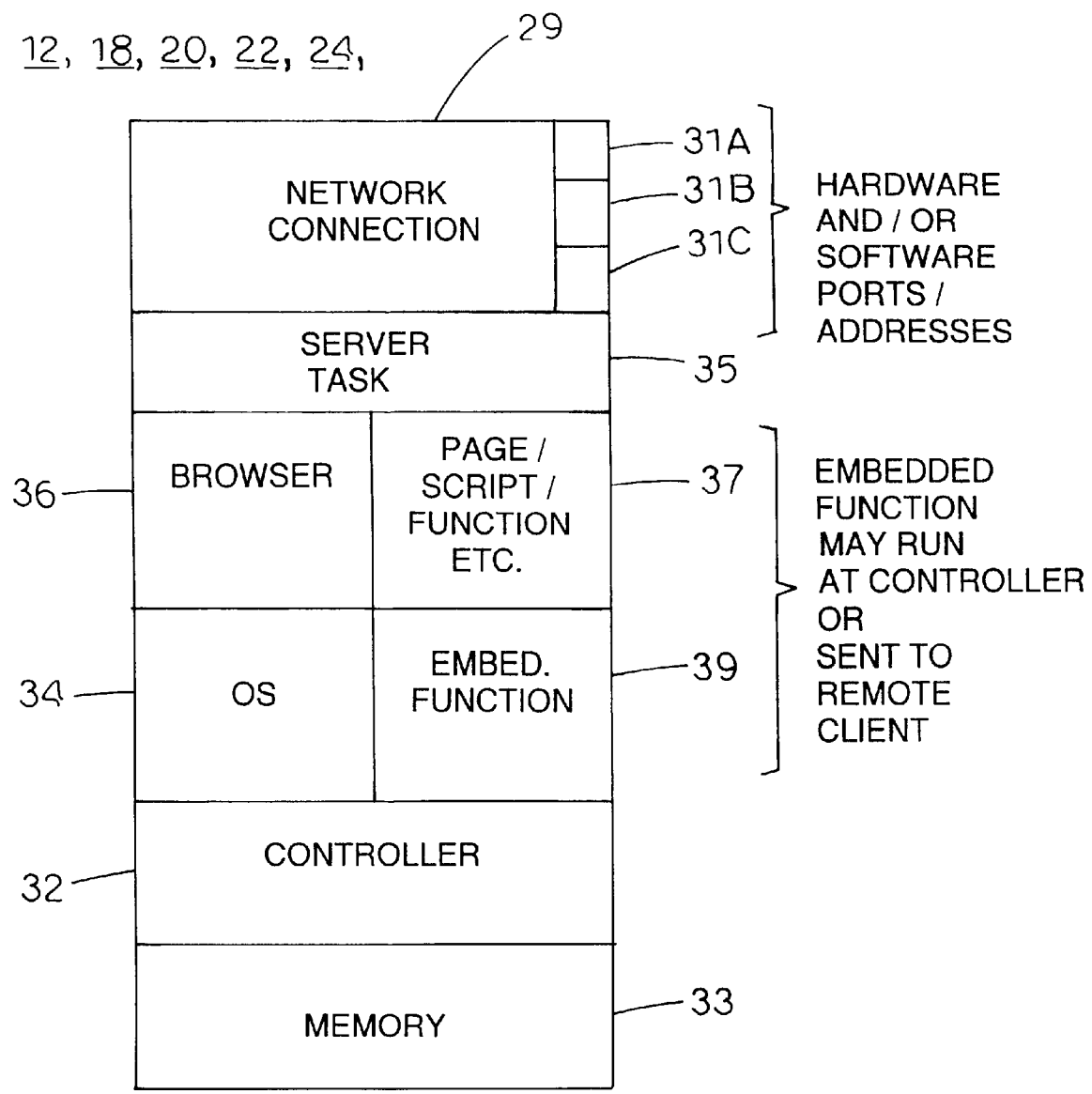
FIG. 4 is a schematic of a server and control system for various devices in a fueling environment constructed according to the present invention.

Turning now to FIG. 4, a typical control system 32 for a fuel dispenser 12 is shown. The system will include a network configuration 29 having multiple hardware and/or software ports or addresses 31A, 31B, 31C. The control system will have a controller 32 associated with memory 33 cooperating to run an operating system 34, server task 35, and browser 36. The browser 36 will access and interpret information from the various local and remote servers. The server or server task 35 in cooperation with the network connection 29 will provide access to the dispenser from the local browsers 25 or remote browsers 27 along a local network or the Internet. Notably, these browsers may be integrated with an existing server 18, 26 or may operate independently. The local browsers 25 are typically able to access the server 35 of the dispenser 12. Preferably, the browsers 27 may also access the server 35 of dispenser 12 directly or through the local server 18 and/or router 19. A software task is defined very broadly to include both separate and integrated software embodiments which may or may not run concurrently with other software.

The local server 18 is preferably integrated or associated with a central control system 50. The central control system 50 may act as the local server 18 or, in the alternative, may operate in association with a separate local server 18. A router may be used to facilitate interconnectivity in the standard fashion. The control system 50 is typically a central site controller used to interface and interact with the fuel dispensers to obtain access, upload information and download information to and from the dispensers 12. Optionally, the remote servers are configured to do the same. Preferably, the local server 18 controls basic interactivity between the network 30 and the various dispensers 12.

The control and server system disclosed in FIG. 4 may be associated with any of the control systems throughout the fueling environment, especially those associated with the dispensers 12, local station and server control system 18, 50, convenience store 20, quick service restaurants 22 and car wash 24.

The present invention provides an embedded function 39 integrated or at least associated with a page 37. The page 37 may be a basic HTML page, script, function or like program. The embedded function may be attached to a header of the page 37 or otherwise associated with the page wherein one of two events occurs when the page is accessed. First, the page 37 along with the embedded function 39 are delivered to the browser that accessed the server and page. Alternatively, the embedded function 39 is adapted to run on the server at which the page was accessed, even though the page is delivered to the appropriate browser. In the first case, the embedded function is adapted to run at the browser while in the second case, the embedded function runs at the server that the browser accessed.

In the first embodiment, the embedded function is preferably any executable content, such as Java™ "applets" or ActiveX™ components. The executable content may be one or more small applications that conform to a restricted set of programming standards for running on browsers. When the embedded function is sent to the browser upon accessing a page, the function is run at the browser to facilitate a connection back to a specific server and server location. In the second embodiment, the embedded function runs at the server and acts to keep the existing connection open as well as continue to periodically send updated HTML pages. This latter technique places fewer demands on a browser's applications capabilities, but is less flexible. The remote browser or client may store the sites, types of data and how often to update or to request an update. The parameters relating to periodic updates may be stored locally at the remote browser, or may be downloaded to the dispenser server. In the latter case, the dispenser server may take the responsibility of periodically sending the data to the remote browser without a request from the remote browser.

Figure 5:
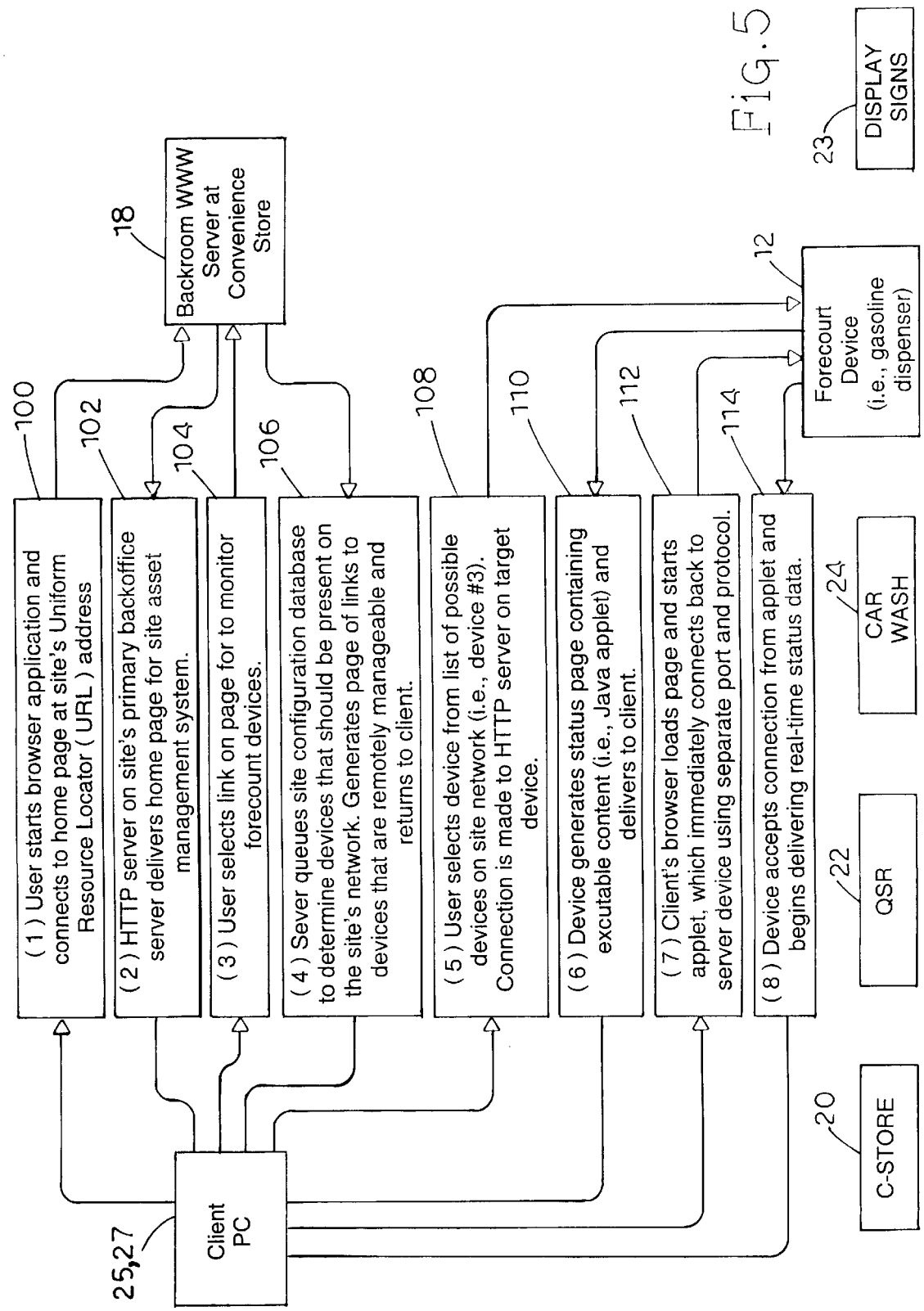
FIG. 5 is a flow diagram of the operation of a first embodiment of the present invention.

A typical process, where the embedded function is actually transferred to the browser from the accessed server, is outlined in FIG. 5. For the process shown, communications are provided between a backroom server 18 at the fuel station store, a fuel dispenser 12 in the forecourt, and a browser 25, 27, preferably running on a client PC. Notably, these three components can take various forms and are disclosed as the specific components only for the purpose of disclosing the preferred embodiment and a general outline of how the system operates. For example, the browser 25, 27 may be located at a remote site along the Internet or other similar network in addition to being located at the backroom of the fuel station store in more localized embodiments. Instead of or in addition to communicating with the fuel dispensers 12, the system may access and provide real-time communications between any server-equipped component in the fuel station store, including servers located in the convenience store 20, quick service restaurants 22, car wash 24, display signs 23, or anywhere along the existing network. The system preferably uses the backroom server 18 as a central control-type server capable of providing the client PC browsers 25, 27 with additional information relating to the equipment and providing links to available servers and other compliant devices in the fueling environment.

Initially, a user at the browser 25, 27 starts a browser application and connects to a homepage at a site's uniform resource locator (URL) address (block 100). An HTTP server 18 having the URL address at the site's primary back office server delivers a home page for a site asset management system to the browser 25, 27 (block 102). The user at the browser 25, 27 selects a defined link on the homepage to access and monitor a select device or function in the fueling environment (block 104). In this example, the selected device is a fuel dispenser in the forecourt of the fueling environment. The backroom server 18 queries a site configuration database to determine devices that should be present on the site's network, generates a page of links to devices that are remotely manageable, and returns this page to the client browser 25, 27 (block 106). The user at the browser 25, 27 will select a device from the list of possible devices on the site network, such as a fuel dispenser, and will connect to the HTTP server on the target device (block 108). The device, the fuel dispenser in this example, generates a status page containing executable content (e.g., a Java™ applet) and delivers the page and the executable content to the client (block 110). For ease of understanding, this executable content is generally referred to as the embedded function.

The client's browser 25, 27 will load the page from the fuel dispenser and run the embedded function (executable content), which immediately connects back to the selected server device, preferably using a separate address or port and protocol (block 112). The device will accept the connection initiated by the embedded function and begin delivering real-time status data to the client browser 25, 27. In addition to monitoring selected information at various ports and addresses at the selected device server, the connection between the browser and the selected device may provide for any type of uploading or downloading of information to monitor, access, and otherwise reconfigure any portion of the device addressable and accessible through the server. For example, the client browser 25, 27 may access a fuel dispenser and download a new configuration or software upgrade, access a server in the convenience store 20 to change prices, implement a special price reduction, or simply gather inventory data. In the preferred embodiment, the backroom server 18 will act as a centralized server providing a browser 25, 27 with the necessary information, addresses and links to recognize and access the various devices in the fueling environment.

Figure 6:
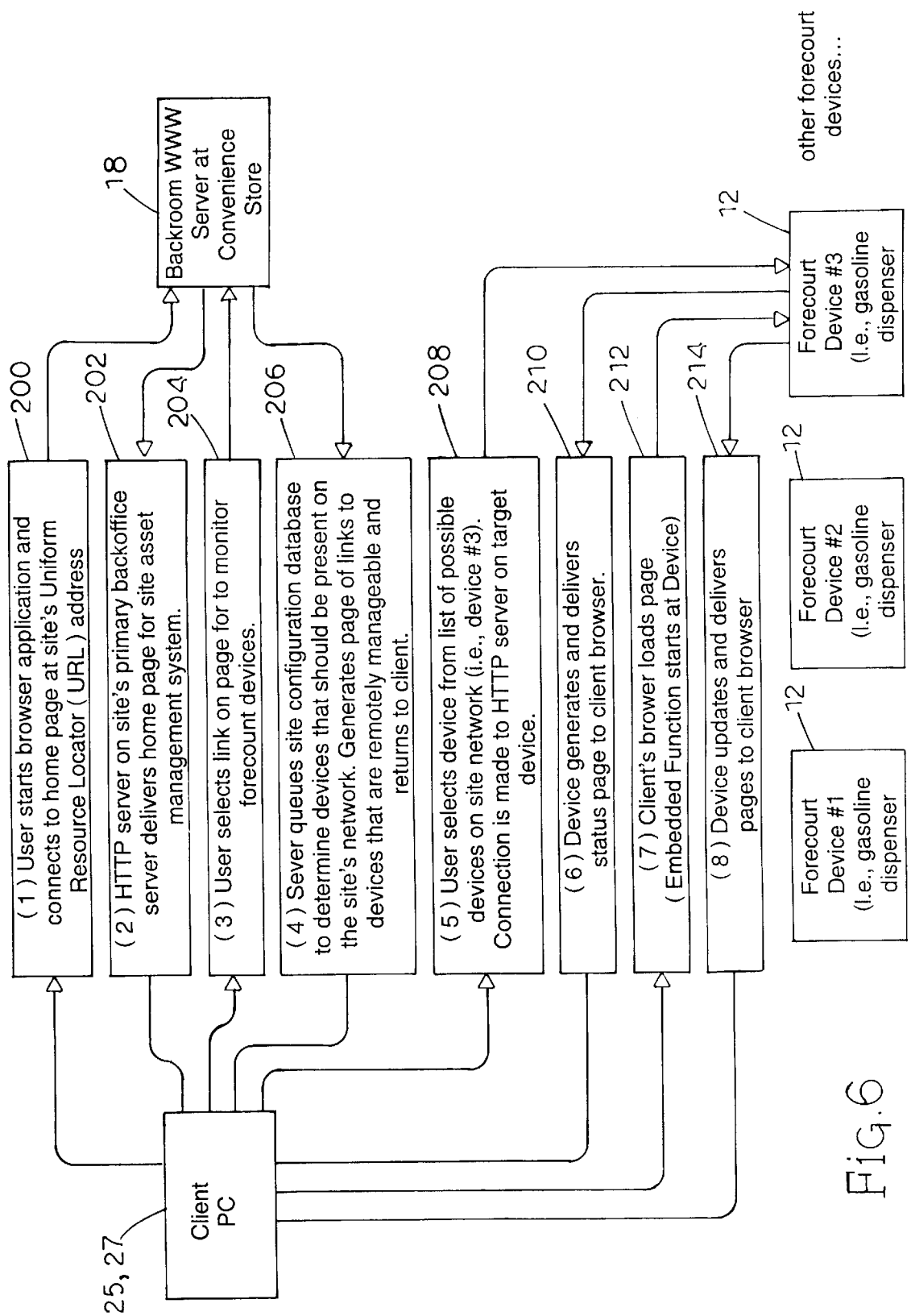
FIG. 6 is a flow diagram of the operation of a second embodiment of the present invention.

As shown in FIG. 6, a variation on the remote management theme is disclosed. The same browsers and servers will operate in this process, although only three fuel dispensers are shown as potential communication targets. The basic process starts when a user of browser 25, 27 starts a browser application and connects to the homepage at a site's URL address of a backroom server 18 (block 200). The HTTP server 18 at the site's primary back office server delivers the homepage to the browser 25, 27 (block 202). The user at the browser 25, 27, selects a link on the homepage to access and monitor forecourt devices, although the homepage may provide links to various other devices and addresses to monitor, download, upload or otherwise mange the selected device remotely (block 204). The backroom server 18 will typically query a site configuration database to determine the devices that are present on the site's network, generate a page of links to those devices that are remotely manageable, and return the list to the browser 25, 27. The user will select the device from the list of possible devices on the site network, in this example forecourt device #3, and connect to the server on the target device (block 208). the selected device will generate and deliver a status page to the client browser 25, 27 (block 210). At block 212, the client browser loads the status page while an embedded function associated with the status page starts running (at the device server of the fuel dispenser 12). The embedded function will have the device or fuel dispenser 12 update and deliver pages to the client browser 25, 27 periodically to provide a monitoring function (block 214). The embedded function may also act to keep the connection open to allow various types of communications back and forth between the client browser and the selected device. With the given system, a very flexible asset management system may be provided.

Figure 7A:
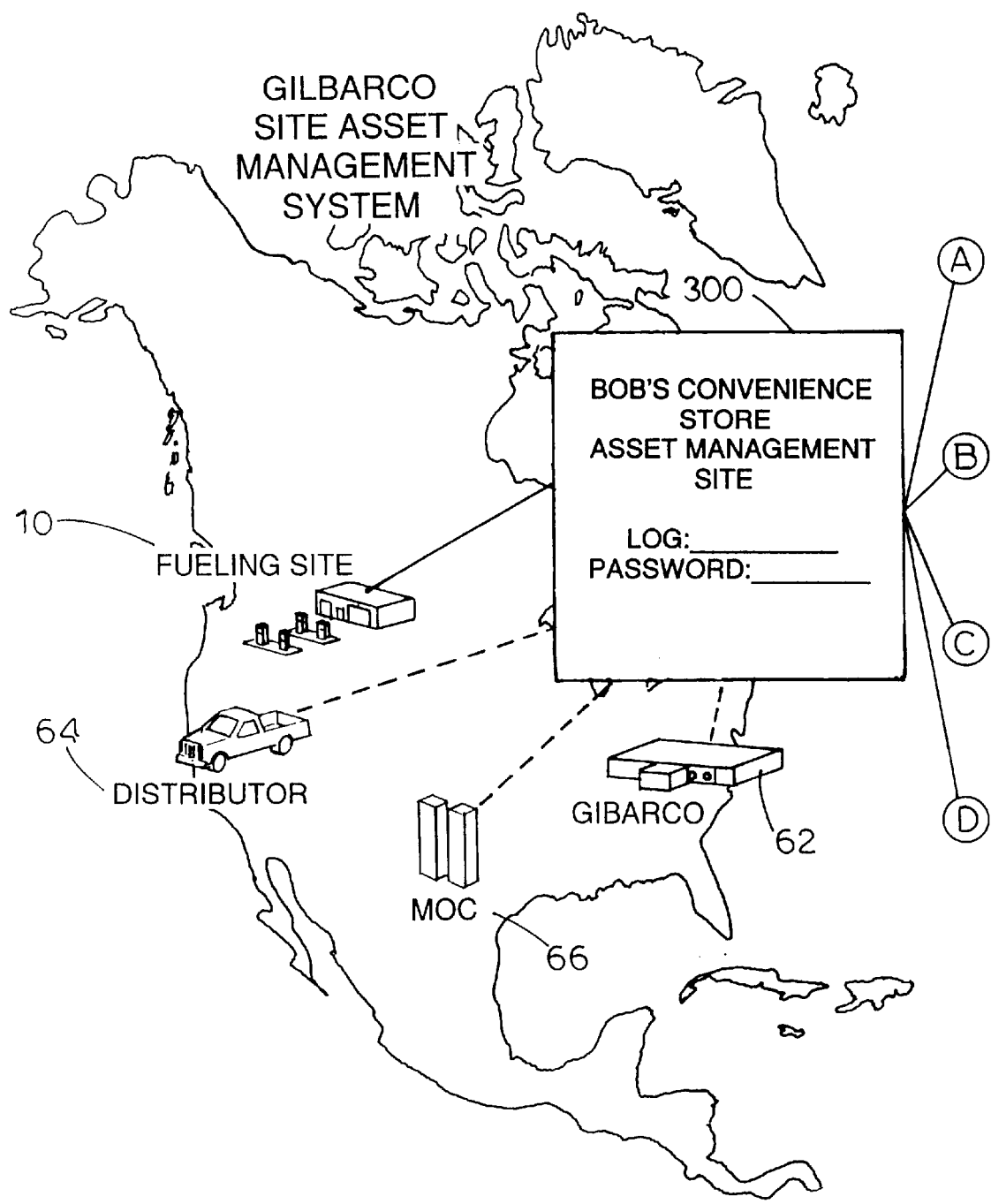
FIG. 7 is a schematic representation of certain of the available features in the asset management system of the present invention.
Figure 7B:
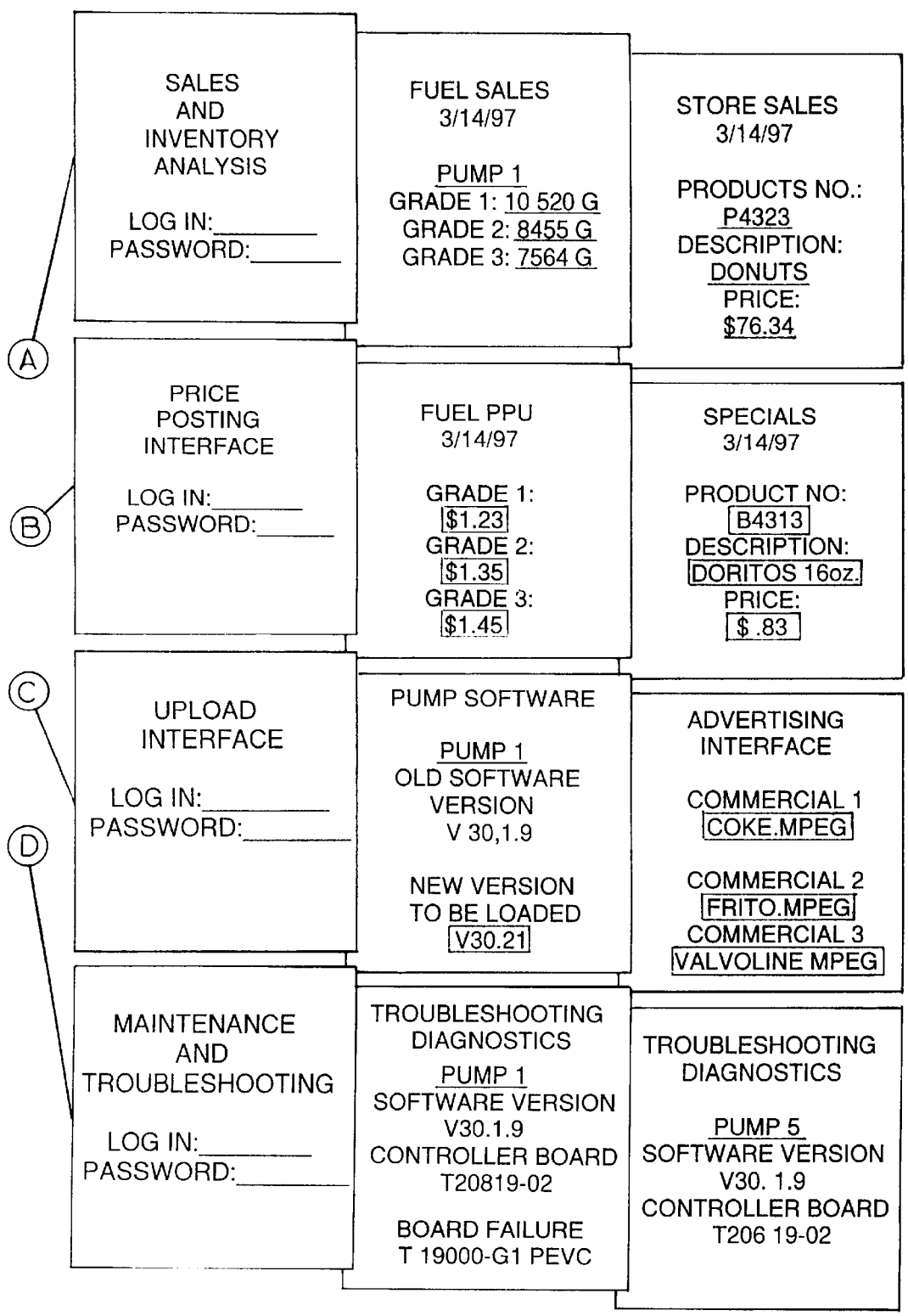

FIG. 7 depicts a hierarchical overview of a fueling site 10 capable of being accessed by and communicating with a distributor 64, major oil companies 66, and a service provider, such as Gilbarco, 62. When accessing the fueling site 10, the server 18 may provide a homepage for logging onto the site's asset management system (block 300). Preferably, an identification number and password are required to access the main site and various levels therein. Different identification numbers and passwords may be required to access different levels and areas of the fueling environment. Those pages and functions depicted in FIG. 7 are exemplary of the variety of functions capable of being provided by the asset management system.

For example, a sales and inventory analysis (block 302) may lead to information relating to the various fuel dispensers (block 304) or convenience store sales information (block 306). Typically, the inventory analysis will provide a quantitative measure of current inventory, sales and product descriptions on a product-by-product basis. The system may also control pricing remotely from a price posting interface page (block 308), which leads to pricing (blocks 310, 312) and provide a way to change prices at the fuel dispenser and the convenience store or other area in the fueling environment, respectively. An uploading interface (block 314) is also provided for features such as upgrading software at the fuel dispensers or changing their configuration (block 316) as well as uploading audio and video for information and advertising (block 318). Preferably, the audio/video files are in an MPEG format. Additionally, remote maintenance and troubleshooting is available (block 320). The troubleshooting and monitoring aspects may be provided (blocks 322 and 324) to receive information from the control systems operating in conjunction with the servers being accessed. For example, a fuel dispenser may provide the remote browser with the software version, hardware version and a type of failure.

Certain modifications and improvements will occur to those skilled in the art upon reading the foregoing description. It should be understood that applicants' invention provides an asset management system wherein the various fuel dispensers and control systems throughout a convenience store, quick service restaurant and any other controllable aspect of a fueling environment may be remotely accessed to provide for uploading information, downloading information and various types of real-time monitoring of the respective devices from a remote location using HTML-compliant components. Local interaction with the devices is not required. It should be understood that all modifications and improvements to the disclosed system have been deleted herein for the sake of conciseness and readability, but are properly within the scope of the following claims.

What is claimed is:

1. A fuel dispenser facilitating remote management functions comprising:
   a. a housing;
   b. a dispenser server at said housing including a control system, a network connection and a dispenser server task running on said control system;
   c. a hypertext markup language compliant page on said server accessible through said network connection;
   d. an embedded function associated with said page and operable to run at said dispenser server to facilitate real-time functions upon access between a remote browser apart from said fuel dispenser and said server over a network; and
   e. a fuel delivery system associated with said housing having a fuel supply line, a metering device, a delivery hose and a nozzle to permit the dispensing of fuel.

2. The dispenser of claim 1 wherein said embedded function is operable to run at said server, when the remote browser accesses the page, to maintain a connection between said server and the remote browser through said network connection.

3. The dispenser of claim 2 wherein said server is adapted to download said page to the remote browser when the page is accessed by the browser.

4. The dispenser of claim 3 wherein said embedded function is adapted to send updated pages to the browser.

5. The dispenser of claim 4 wherein said control system generates said updated pages including dispenser related information.

6. The dispenser of claim 5 wherein said control system generates said updated pages in real-time.

7. The dispenser of claim 4 wherein said updated pages are sent to the browser periodically.

8. The dispenser of claim 1 wherein said real-time function includes delivering real-time data upon access.

9. The dispenser of claim 1 wherein said embedded function is executable.

10. The dispenser of claim 1 further comprising a user interface including a display, said embedded function providing for the uploading of video to said display.

11. The dispenser of claim 1 wherein the network is the Internet.

12. The dispenser of claim 1 wherein the network is a local network.

13. A fuel dispenser facilitating remote management functions comprising:
   a. a housing;
   b. a dispenser server at said housing including a control system, a network connection and a dispenser server task running on said control system;
   c. said server cooperating with at least first and second dispenser resources accessible through said network connection from a remotely located browser apart from said fuel dispenser over a network;
   d. said first resource providing a hypertext markup language compliant response to a first access by the browser;
   e. said second resource providing a hypertext markup language compliant function;
   f. an embedded function associated with said hypertext markup language compliant response and operable to run at said dispenser server to facilitate a connection between the remote browser and said server system to access said second resource; and
   g. a fuel delivery system associated with said housing having a fuel supply line, a metering device, a delivery hose and a nozzle to permit the dispensing of fuel.

14. A retail system facilitating remote management functions comprising:
   a. a housing;
   b. a server at said housing including a control system, a network connection and a server task running on said control system;
   c. a hypertext markup language-compliant page on said server accessible through said network connection; and
   d. an embedded function associated with said page and operable to facilitate real time functions between a remote browser apart from said fuel dispenser and said server over a network;
   e. said embedded function being operable to run at said server, when the remote browser accesses the page, to maintain a connection between said server and the remote browser through said network connection.

15. The dispenser of claim 14 wherein said server is adapted to download said page to the remote browser when the page is accessed by the browser.

16. The dispenser of claim 15 wherein said embedded function is adapted to send updated pages to the browser.

17. The dispenser of claim 16 wherein said control system generates said updated pages including dispenser related information.

18. The dispenser of claim 17 wherein said control system generates said updated pages in real-time.

19. The dispenser of claim 16 wherein said updates pages are sent to the browser periodically.

* * * * *